United States Patent
Amasaki et al.

(10) Patent No.: US 7,434,981 B2
(45) Date of Patent: Oct. 14, 2008

(54) MANUFACTURING METHOD OF METAL PASTE

(75) Inventors: Kazuyoshi Amasaki, Tokyo (JP); Shuichi Kohayashi, Tokyo (JP); Yoshikazu Omoto, Tokyo (JP)

(73) Assignee: DOWA Electronics Materials Co., Ltd., Tokyo (JP)

( * ) Notice: Subject to any disclaimer, the term of this patent is extended or adjusted under 35 U.S.C. 154(b) by 375 days.

(21) Appl. No.: 11/137,406

(22) Filed: May 26, 2005

(65) Prior Publication Data

US 2005/0267243 A1 Dec. 1, 2005

(30) Foreign Application Priority Data

May 28, 2004 (JP) ............... 2004-159868

(51) Int. Cl.
*B01F 3/14* (2006.01)
(52) U.S. Cl. ............... 366/145; 366/286; 241/23; 241/257.1; 241/259
(58) Field of Classification Search ............... 241/24.1, 241/257.1, 259, 296, 23; 366/145, 286
See application file for complete search history.

(56) References Cited

U.S. PATENT DOCUMENTS

| | | | | |
|---|---|---|---|---|
| 18,985 | A | * | 12/1857 | Olds ............... 241/259 |
| 2,121,275 | A | * | 6/1938 | Zober et al. ............... 241/206 |
| 3,527,595 | A | * | 9/1970 | Adler ............... 148/426 |
| 3,697,301 | A | | 10/1972 | Donofrio et al. |
| 4,477,689 | A | | 10/1984 | Ogasahara et al. |
| 4,576,736 | A | * | 3/1986 | Harmuth ............... 252/512 |
| 5,398,398 | A | | 3/1995 | Williams et al. |
| 5,447,291 | A | | 9/1995 | Sandhage |
| 5,600,202 | A | | 2/1997 | Yamada et al. |
| 6,180,029 | B1 | | 1/2001 | Hampden-Smith et al. |
| 6,504,297 | B1 | | 1/2003 | Heo et al. |
| 6,670,748 | B2 | | 12/2003 | Ellens et al. |

(Continued)

FOREIGN PATENT DOCUMENTS

EP 0 459 156 A2 4/1991

(Continued)

OTHER PUBLICATIONS

U.S. Appl. No. 10/984,772, filed Nov. 10, 2004, Nagatomi et al.

(Continued)

*Primary Examiner*—David L Sorkin
(74) *Attorney, Agent, or Firm*—Oliff & Berridge, PLC

(57) ABSTRACT

A metal paste, in which a filler mainly composed of metal is mixed with good dispersibility, is manufactured with good productivity at a low cost without generating a foil of the metal. A paste-like material (referred to as a paste material hereafter) containing a metal filler is fed into a gap between a pair of rotating whetstones 11 and 12 which are relatively rotated while facing with each other having a specified gap therebetween, to pass and discharge therein. The paste material is thus kneaded and dispersed. In addition, the paste material is kneaded and dispersed by suppressing the generation of a metal foil, adjusting the gap to a specified interval dg and feeding the paste material into the interval while applying thereon a predetermined positive pressure and/or negative pressure.

3 Claims, 4 Drawing Sheets

U.S. PATENT DOCUMENTS

| | | |
|---|---|---|
| 7,138,756 B2 | 11/2006 | Gotoh et al. |
| 2002/0043926 A1 | 4/2002 | Takahashi et al. |
| 2003/0030038 A1 | 2/2003 | Mitomo et al. |
| 2003/0030368 A1 | 2/2003 | Ellens et al. |
| 2003/0094893 A1 | 5/2003 | Ellens et al. |
| 2003/0132422 A1 | 7/2003 | Tian et al. |
| 2003/0152804 A1 | 8/2003 | Miura et al. |
| 2003/0213611 A1 | 11/2003 | Morita |
| 2004/0155225 A1 | 8/2004 | Yamada et al. |
| 2004/0263074 A1 | 12/2004 | Baroky et al. |
| 2005/0001225 A1 | 1/2005 | Yoshimura et al. |
| 2005/0189863 A1 | 9/2005 | Nagatomi et al. |
| 2005/0203845 A1 | 9/2005 | Yoshimine et al. |
| 2005/0205845 A1 | 9/2005 | Deising et al. |
| 2005/0253500 A1 | 11/2005 | Gotoh et al. |
| 2005/0267243 A1 | 12/2005 | Amasaki et al. |
| 2006/0006782 A1 | 1/2006 | Nagatomi et al. |
| 2006/0017365 A1 | 1/2006 | Nagatomi et al. |
| 2006/0021788 A1 | 2/2006 | Kohayashi et al. |
| 2006/0022573 A1 | 2/2006 | Gotoh et al. |
| 2006/0033083 A1 | 2/2006 | Sakane et al. |
| 2006/0043337 A1 | 3/2006 | Sakane et al. |
| 2006/0045832 A1 | 3/2006 | Nagatomi et al. |
| 2006/0065878 A1 | 3/2006 | Sakane et al. |
| 2006/0076883 A1 | 4/2006 | Himaki et al. |
| 2006/0091790 A1 | 5/2006 | Nagatomi et al. |
| 2006/0170332 A1 | 8/2006 | Tamaki et al. |
| 2006/0197432 A1 | 9/2006 | Nagatomi et al. |
| 2006/0197439 A1 | 9/2006 | Sakane et al. |
| 2006/0220047 A1 | 10/2006 | Nagatomi et al. |
| 2006/0220520 A1 | 10/2006 | Sakane et al. |
| 2006/0244356 A1 | 11/2006 | Nagatomi et al. |
| 2007/0007494 A1 | 1/2007 | Hirosaki et al. |
| 2007/0029525 A1 | 2/2007 | Gotoh et al. |
| 2007/0164308 A1 | 7/2007 | Yoshimura et al. |

FOREIGN PATENT DOCUMENTS

| | | |
|---|---|---|
| EP | 1 296 376 A2 | 3/2003 |
| EP | 1 445 295 A1 | 8/2004 |
| JP | 05-015655 | 1/1993 |
| JP | 05-198433 | 8/1993 |
| JP | 11-144938 | 5/1999 |
| JP | 11-277527 A | 10/1999 |
| JP | 2000-073053 | 3/2000 |
| JP | 2000-153167 A | 6/2000 |
| JP | 2001-214162 | 8/2001 |
| JP | 2002-363554 | 12/2002 |
| JP | 2003-013059 | 1/2003 |
| JP | 2003-096446 | 4/2003 |
| JP | 2003-124527 | 4/2003 |
| JP | 2003-515655 | 7/2003 |
| JP | 2003-277746 | 10/2003 |
| JP | 2003-336059 | 11/2003 |
| JP | 2004-055910 | 2/2004 |
| JP | 2004-505470 | 2/2004 |
| JP | 2004-067837 | 3/2004 |
| JP | 2004-145718 | 5/2004 |
| JP | 2004-166058 | 6/2004 |
| JP | 2004-189997 | 7/2004 |
| JP | 2004-207271 | 7/2004 |
| JP | A-2004-186278 | 7/2004 |
| JP | 2004-235598 | 8/2004 |
| JP | 2004-248405 | 8/2004 |
| JP | 2004-250920 | 8/2004 |
| JP | 2004-253312 | 8/2004 |
| JP | 2004-244560 | 9/2004 |
| JP | 2004-055536 | 12/2004 |
| JP | 2004-368153 | 12/2004 |
| JP | 2005-075854 | 3/2005 |
| JP | 2005-103429 | 3/2005 |
| JP | 2005-105126 | 3/2005 |
| JP | 2005-192691 | 6/2005 |
| JP | 2005-344025 | 12/2005 |
| JP | 2006-028295 | 2/2006 |
| JP | 2006-063214 | 3/2006 |
| JP | 2006-063286 | 3/2006 |
| JP | 2006-070109 | 3/2006 |
| JP | 2006-176546 | 7/2006 |
| JP | A-2006-282809 | 10/2006 |
| JP | A-2006-282872 | 10/2006 |
| WO | WO 01/40403 A1 | 6/2001 |
| WO | WO 02/11214 A1 | 2/2002 |
| WO | WO 2004/030109 A1 | 4/2004 |
| WO | WO 2004/039915 A1 | 5/2004 |
| WO | WO 2004/055910 A1 | 7/2004 |
| WO | WO 2005/052087 A1 | 6/2005 |
| WO | WO 2006-093298 A1 | 9/2006 |

OTHER PUBLICATIONS

U.S. Appl. No. 11/061,669, filed Feb. 22, 2005, Nagatomi et al.
U.S. Appl. No. 11/063,847, filed Feb. 23, 2005, Sakane et al.
U.S. Appl. No. 11/149,317, filed Jun. 10, 2005, Nagatomi et al.
U.S. Appl. No. 11/149,192, filed Jun. 10, 2005, Sakane et al.
U.S. Appl. No. 11/198,281, filed Aug. 8, 2005, Nagatomi et al.
U.S. Appl. No. 11/194,590, filed Aug. 2, 2005, Gotoh et al.
U.S. Appl. No. 11/211,751, filed Aug. 26, 2005, Sakane et al.
U.S. Appl. No. 11/218,504, filed Sep. 6, 2005, Nagatomi et al.
Jis Z 8726; "Method of Specifying Colour Rendering Properties of Light Sources"; (1990), pp. 381-390.
"Phosphor Handbook"; (compiled by Phosphor Research Society, published by Ohmusha, Ltd., 1987); pp. 172-176.
U.S. Appl. No. 11/194,590, filed Aug. 2, 2005.
K. Uheda et al., "The Crystal Structure and Photoluminescence Properties of a New Red Phosphor, Calcium Aluminum Silicon Nitride Doped With Divalent Euroium," Abs. 2073, 206th Meeting., Oct. 3, 2004.

* cited by examiner

Embodiment 1

MANUFACTURING METHOD OF METAL PASTE

FIELD OF THE INVENTION

The present invention relates to a manufacturing method of a metal paste in which a metal filler is mixed and dispersed, and particularly to the manufacturing method of the metal paste in which metal powder is dispersed and contained in a resin.

BACKGROUND OF THE INVENTION

A metal paste containing metal (a single metal or alloy) as a mixed dispersion is manufactured by kneading and dispersing a paste-like material (referred to as a paste material hereafter) containing a metal filler, as a material of a dispersion. As a kneading/dispersion method, a method using a ball mill, a method using a kneader, a method of using a roll mill recited in patent document 1, and a method using a colloid mill recited in patent document 2 are used according to the purpose of use.

Patent document 1 Japanese Patent Laid Open No.11-277527

Patent document 2 Japanese Patent Laid Open No.2000-153167

However, when the metal paste is manufactured by kneading and dispersing the paste material by means of the ball mill, in some cases, entry of impurities occurs into the metal paste by a friction caused by collision of balls themselves or by collision of balls and a wall surface. In addition, a problem arises such that when a particle diameter of the metal filler is made to be small in a target dispersion state of the metal paste, the balls must also be made to be small accordingly, thus deteriorating productivity with smaller balls.

When the metal paste Is manufactured by using the kneader, an undispersed stagnation place is generated on the wall surface of a vessel. Thus, it becomes difficult to uniformly disperse the metal filler over the entire body of the paste material.

When the metal paste is manufactured by using the roll mill, the gap between rolls is adjusted to reduce the particle diameter of the metal filler to a specified size. Thus, the metal paste is passed through the rolls for a plurality of times while gradually reducing the gap, thus deteriorating the productivity.

Here, when the gap between the rolls is reduced once to improve the productivity, since the metal filler exhibits spreading property, it is collapsed to generate a foil of a filler (metal foil), and a product becomes defective.

In the metal paste having an excellent printability, which is generally required, viscosity characteristics thereof is required to be 60 (Pa·s) or larger at a measured value by a rotational viscometer rotating at a shear rate of $2 \text{ s}^{-1}$, or 30 (Pa·s) or larger at the measured value by the rotational viscometer rotating at a shear rate of $10 \text{ s}^{-1}$. Also, when the measured value by the rotational viscometer rotating at a shear rate of $10 \text{ s}^{-1}$ is set to be $\eta 2$, and when the measured value by the rotational viscometer rotating at a shear rate of $10 \text{ s}^{-3}$ is set to be $\eta 10$, the "thixotropic ratio" defined as the value of $(\eta 2/\eta 10)$ is required to be in a range from 1.5 to 2.5.

Further, in the metal paste having the excellent printability, a maximum particle diameter of the metal filler contained therein is required to be 50 μm or less.

However, even if the gap of whetstones in the colloid mill is adjusted and the paste material is fed in the gap between colloid mills in order to manufacture such a metal paste having excellent printability by the colloid mill, it is difficult to pass the paste material therethrough due to high viscosity of the paste material. Thus, the metal paste can not be manufactured.

Here, as a precursor to the present invention, the inventors of the present invention try to manufacture the metal paste, by adjusting an amount of a solvent to be added such as alcohols contained in the paste material, decreasing the viscosity of the paste material, and thereafter using the colloid mill. As a result, it is found that when the value is 40 (Pa·s) or less at the shear rate of $2 \text{ s}^{-1}$, and the value is 20 (Pa·s) or less at the shear rate of $10 \text{ s}^{-1}$, it becomes possible to manufacture the metal paste by using the colloid mill. However, in the metal paste manufactured from the paste material satisfying a viscosity range as described above, the content of the solvent is excessive, and this is undesirable in terms of its original purpose of use.

SUMMARY OF THE INVENTION

In view of the above-described problem, the present invention is provided, and an object of the present invention is to provide a method of manufacturing a metal paste in which a filler mainly composed of metal is mixed therein with excellent dispersibility without generating a foil of the metal at a low cost with good productivity.

In order to solve the aforementioned problem, inventors of the present invention achieves the idea that in a manufacturing method of the metal paste containing metal as a mixed dispersion obtained by kneading and dispersing a metal filler, by keeping the temperature of a paste material containing the metal filler, which is a material of the dispersion, to a specified temperature of not less than a room temperature, a viscosity of the paste material is reduced, then the paste material is fed into the gap of the whetstones in a colloid mill, to thereby manufacture the metal paste with metal filler having high dispersion property, and further by feeding the paste material into the gap of the whetstones in the colloid mill while applying a positive pressure and/or a negative pressure on the paste material, the metal paste can be manufactured with high productivity.

Specifically, the present invention takes several aspects as follows.

A first aspect provides a manufacturing method of a metal paste in which a paste-like material (referred to as a paste material hereafter) containing a metal filler is fed and kneaded and dispersed in a gap of whetstones which are relatively rotated while facing with each other having a prescribed gap therebetween so that the metal filler is mixed and dispersed in the paste material, wherein the paste material is kneaded and dispersed while keeping the temperature of the paste material larger than the temperature of a viscosity at which the paste material is capable of passing through the gap of a pair of whetstones.

A second aspect provides the manufacturing method of the metal paste according to the first aspect, wherein the metal filler is mixed and dispersed in the paste material by adjusting a gap interval dg of the whetstones in a range from (⅕) dm to 2 dm, when a maximum particle diameter of the metal filler in the paste material is dm.

A third aspect provides the manufacturing method of the metal paste according to either of the first aspect or the second aspect, wherein temperature of the paste material Is kept to the temperature within a range from 10 to 40 (Pa·s) at a measured value by a rotational viscometer rotating at a shear rate of $2 \text{ s}^{-1}$, and from 2 to 20 (Pa·s) at the measured value of the rotational viscometer rotating at the shear rate of $10 \text{ s}^{-1}$.

A fourth aspect provides the manufacturing method of the metal paste according to any one of the first aspect to the third aspect, wherein the temperature of the paste material is kept in a range from 40° C. to 80° C.

A fifth aspect provides the manufacturing method of the metal paste according to any one of the first aspect to fourth aspect, wherein the paste material is kneaded and dispersed, while applying a pressure difference of 0.01 MPa to 0.5 MPa between the paste material fed into the whetstones and the paste material fed out from the whetstones.

Thus, the metal paste having the filler mainly composed of metal mixed therein with improved dispersibility can be manufactured without generating the foil of the metal, with good productivity at a low cost.

DESCRIPTION OF THE PREFERRED
EMBODIMENTS OF THE INVENTION

First, with reference to FIG. 4, explanation will be given to a relation between a temperature of a paste material and its viscosity, and conditions when the paste material passes through a gap between upper and lower rotating whetstones.

Figure 4:
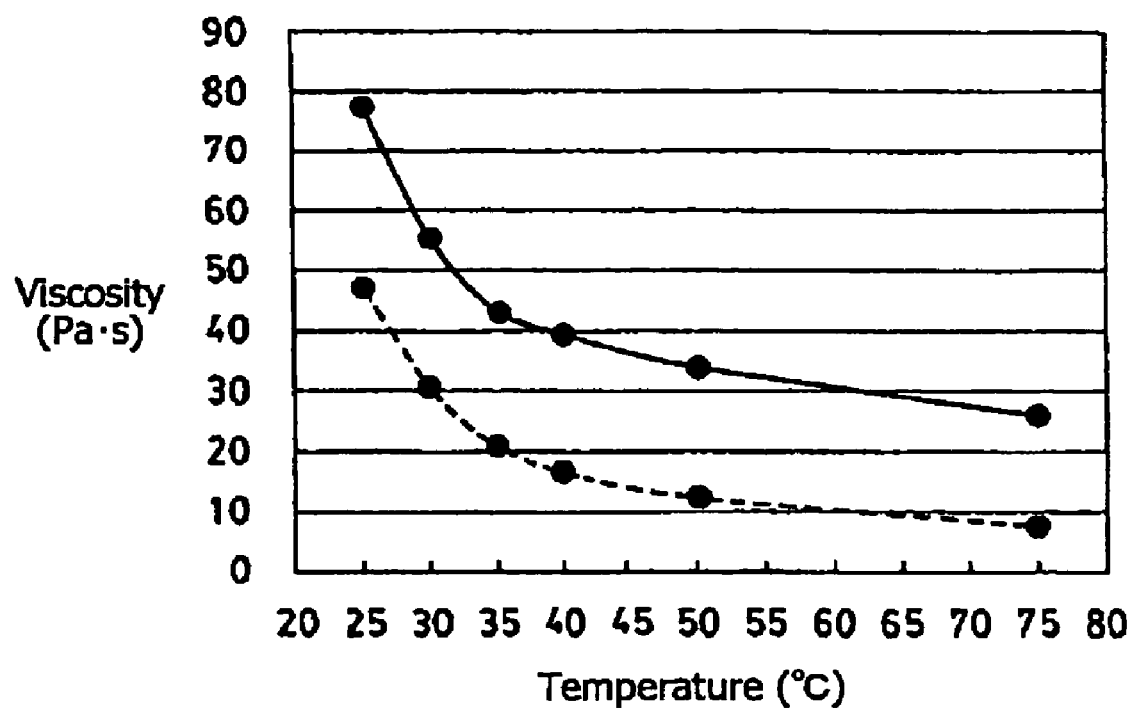
FIG. 4 is a graph showing a relation between a temperature and a viscosity of a paste material.

FIG. 4 is a graph with a viscosity (Pa·s) of the paste material as vertical axis and a temperature (° C.) of the paste material as horizontal axis.

The viscosity of the paste material was measured by using spindle No.CP52 of a rotational viscometer (digital rheometer type DV-III by Brookfield Engineering Laboratories) to set the shear rate of the rotational viscometer to be $2\ s^{-1}$ and $10\ s^{-1}$. In measurement, a measurement temperature was set to be in a range from 25° C. to 75° C.

Here, the measurement was performed by setting the shear rate of the rotational viscometer to be $2\ s^{-1}$ and $10\ s^{-1}$. This is because it is preferable to measure the viscosity at both fast shear rate and slow shear rate, for grasping the viscosity expecting the thixotropy property, because the paste material has the thixotropy property. In FIG. 4, a plot at the shear rate of $2\ s^{-1}$ is shown by solid line, and the plot at the shear rate of $10\ s^{-1}$ is shown by broken line.

In addition, the paste material obtained by preliminarily kneading silver powder 170 g as metal powder, acrylic resin 9 g as a resin, terpineol 24 g as a solvent and glass powder (manufactured by NIPPON ELECTRIC GLASS CO LTD-8) 5G as a filler, was used as a sample having a standard composition as the metal paste.

As obviously shown in FIG. 4, it was found that the viscosity of the paste material was decreased as the temperature rose, and in the paste material, the viscosity reached a level of 40 (Pa·s) or less at the value of the shear rate $2\ s^{-1}$, and 20 (Pa·s) or less at the value of the shear rate $10\ s^{-1}$, where treatment by the colloid mill was possible.

Here, when the temperature of the paste material is excessively raised, there is a fear that the solvent contained in the paste material is evaporated, the resin contained therein starts curing, and properties of the metal paste thus manufactured changes. Therefore, in order to avoid such circumstances, preferably the temperature rise of the paste material is kept to be 80° C. or less.

Here, the inventors of the present invention studied on the mixing and dispersing treatment while keeping the temperature at which the viscosity of the paste material, which can be treated by the colloid mill, is obtained. From this study, it was found that at manufacturing the paste material, when $dg > (\frac{1}{5})$ dm was satisfied, where dg was the gap between upper and lower rotating whetstones of the colloid mill and dm was the maximum particle diameter of the metal filler in the paste material before treatment, generation of the metal foil was suppressed. Also, when $dg < 2\ dm$ is satisfied, sufficient time can be secured for kneading the paste material between the whetstones, and therefore preferably a high dispersibility can be obtained. Namely, it was found that by setting dg in the range of $(\frac{1}{5})dm < dg < 2\ dm$, a high quality metal paste could be manufactured.

As a result of the kneading and dispersing treatment, the metal paste, in which the filler mainly composed of silver is mixed with good dispersibility, could be manufactured without generating the foil of silver. This is because by increasing the temperature of the paste material, the viscosity of the resin in the paste material is decreased and reactivity and coating properties of the resin and the metal are increased to improve a dispersion effect of the metal filler, and the generation of the metal foil is suppressed. Further, by returning the temperature of the metal paste thus manufactured to a room temperature, the viscosity could be returned to the viscosity suitable for the original purpose of the metal paste.

In addition, in the metal paste material in a range used for a material of the metal paste, even when the kind of the solvent, content of the solvent and the kind of the metal used as the filler are changed, the metal paste, in which the filler mainly composed of the metal kind was mixed therein with good dispersibility, could be similarly manufactured without generating the foil of the metal kind.

Further, from the aforementioned study, when the paste material is passed through the gap between the upper and lower rotating whetstones of the colloid mill, it was found that by feeding the paste material while applying a pressure difference of 0.01 MPa to 0.5 MPa between the paste material fed into the rotating whetstone and the paste material fed out from the rotating whetstone, the productivity of the metal paste can be improved. The method of applying the pressure difference to the paste material includes the method directly applying the pressure to the paste material fed into the rotating whetstones, the method of applying the pressure to the paste material set in the colloid mill through a pressure medium such as compressed air, and the method of decreasing the pressure of the circumference of the upper and lower rotating whetstones or the like. Any one of the aforementioned methods or the methods in combination thereof can be used. At this time, when the pressure difference is in the range from 0.01 MPa to 0.5 MPa, preferably a good quality of the manufactured metal paste is obtained and a device of the colloid mill as will be described hereafter is obtained at a low cost.

EXAMPLE 1

Figure 1:
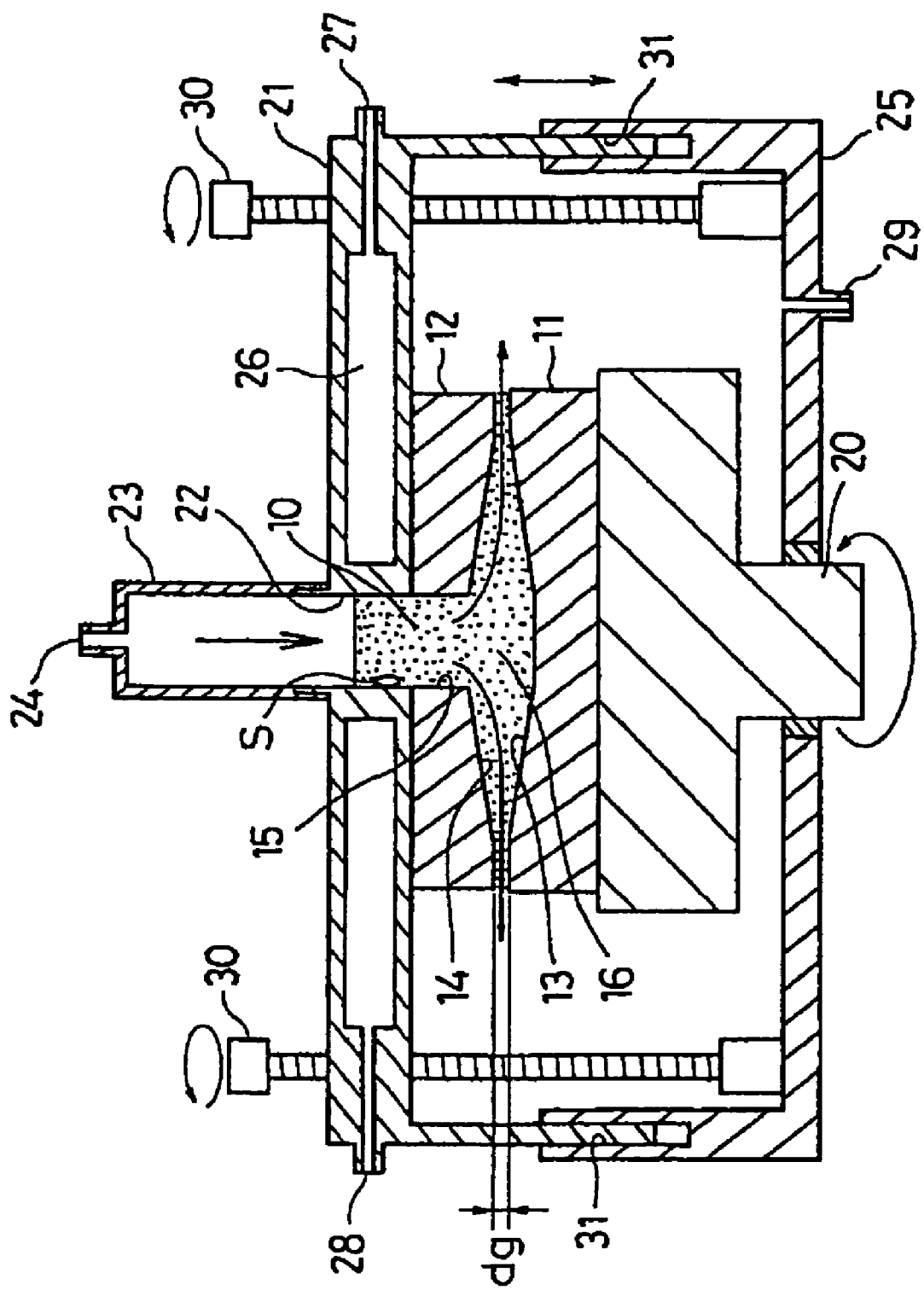
FIG. 1 is an abbreviated sectional view schematically showing an essential part of a mixing and dispersing device used for manufacturing a metal paste according to the present invention.

First, the colloid mill used for manufacturing the metal paste according to the present invention will be explained with reference to the drawings. FIG. 1 is an abbreviated sectional view schematically showing an essential part of an example of the colloid mill.

In FIG. 1, a lower whetstone 11 on a rotating disk 20 is provided so as to face an upper whetstone 12, having a specified gap dg therebetween. Here, since the upper whetstone 12 is fixed to an upper housing 21, the upper and lower whetstones 11 and 12 are relatively rotated in association with a rotation of the disk 20. The gap interval dg between the upper and lower whetstones 11 and 12 is adjustable to a specified value by the vertical movement of the upper whetstone 12 as will be described later. Note that the disk 20 is penetrated through a bottom part of a lower housing 25 while rotatably keeping airtightness.

The lower whetstone 11 has a lower inclined plane 13 formed on the upper surface thereof, so as to face upward from the center side toward the outer periphery, and the upper whetstone 12 also has an upper inclined plane 14 formed on the lower surface thereof so as to face downward from the center toward the outer periphery, relatively to the lower inclined plane 13. By the lower inclined plane 13 and the upper inclined plane 14, an inner void part 16 of the whetstones is formed. The upper inclined plane 14 further continues to a raw material poring part 15 provided centering around a relative rotation axis of the upper whetstone 12, and the raw material poring part 15 continues to a raw material poring port 22 provided in the upper housing 21. In the raw material poring port 22, a raw material poring cylinder 23 is further provided, with its tip part serving as a pressure port 24. Here, the upper whetstone 12, the raw material poring port 22, and the raw material poring cylinder 23 are detachably air-tightly connected to each other. A paste material 10 is filled in the raw material poring port 22 from the inner void part 16 of the whetstones, and the temperature of the paste material 10 is measured by a temperature sensor S.

Further, the upper and lower whetstones 11 and 12 are kept in an air-tight state by the upper housing 21 and the lower housing 25. Here, the upper housing 21 is supported by a support 30 which is rotatable, has a spiral groove, and is supported to the lower housing 25. By rotating the support 30, an interval between the upper and lower housings 21 and 25 is expandable. Then, by expandable operation of the interval between the upper and lower housings 21 and 25, the interval gap dg between the upper and lower whetstones 11 and 12 is adjusted. Note that the upper and lower housings 21 and 25 are joined through a slidable vacuum seal 31. Therefore, the interval between the upper and lower housings 21 and 25 is expandable while keeping air-tightness in the housing.

In addition, a pressure reducing hole 29 is provided in a proper place of the upper housing 21 or the lower housing 25, and an exhauster is connected thereto to exhaust the housing. The interior of the housing can be thus kept under a negative pressure. Further, a void 26 for temperature adjustment is bored inside a ceiling face touching on the upper whetstone 12 of the upper housing 21. Thus, by circulating a heating medium from outside through an inlet and an outlet 27 and 28 for temperature adjustment, the upper and lower whetstones 11 and 12 can be adjusted to a desired temperature.

Next, the manufacturing method of the metal paste by using the colloid mill will be explained.

The sample of the paste material 10 was prepared by preliminarily kneading silver powder 170 g, acrylic resin 9 g, terpineol 24 g and glass powder (GA-8 manufactured by NIPPON ELECTRIC GLASS CO LTD) 5G.

Figure 2:
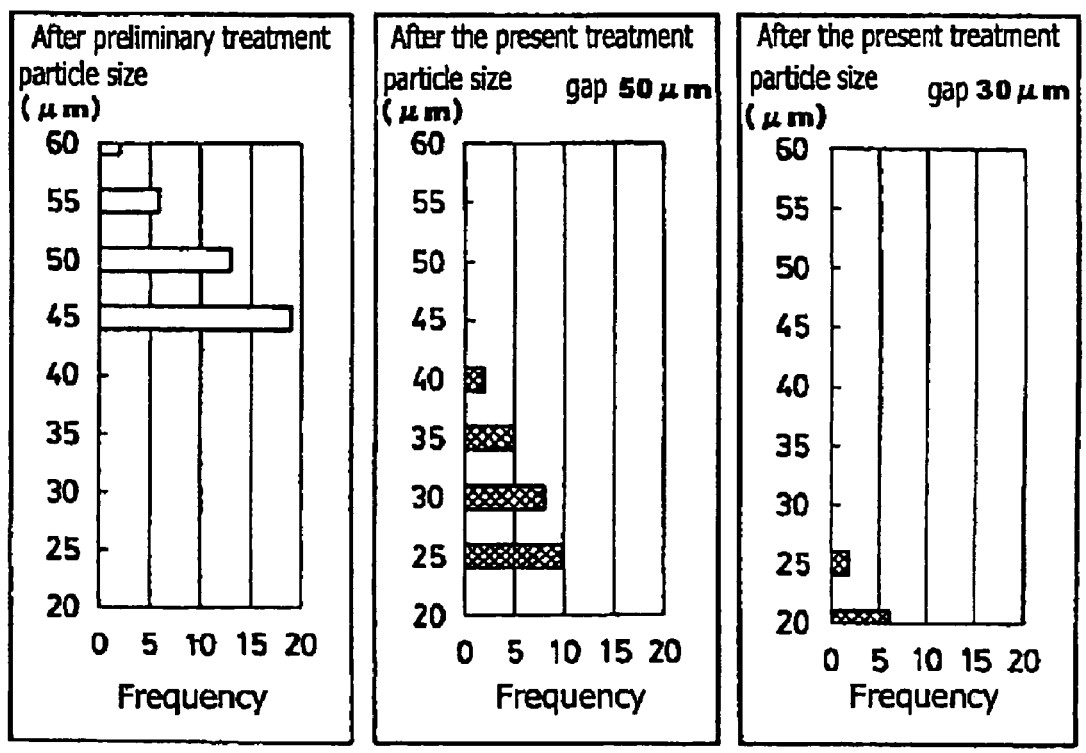
FIG. 2 is a graph showing a particle diameter distribution state after preliminary treatment and after the present treatment measured in an example of the present invention.

Here, in order to examine a state of the filler in the paste material thus obtained by preliminary kneading, a maximum value of a size of a remaining particle was measured by a grind gage, and a result is shown in a graph of FIG. 2 (after preliminary treatment). FIG. 2 shows the graph with a particle diameter as vertical axis and an existence frequency of the particle having the diameter thus obtained as horizontal axis. As shown in the graph of FIG. 2 (after preliminary treatment), the particle diameter in the paste material was 45 μm or more, and the maximum particle diameter dm was 60 μm.

In the colloid mill, the upper and lower whetstones 11 and 12 with 100 mm diameter were set.

Two values were set as the interval gap (dg) of the whetstones, such as 50 m and 30 μm.

When the metal paste is manufactured by the colloid mill, water of 70° C. is circulated in advance within the void 26 for temperature adjustment through the inlet and outlet 27 and 28 for temperature adjustment. The temperature of the upper and lower whetstones 11 and 12 was thus kept to 70° C.

When the temperature of the upper and lower whetstones 11 and 12 were set to be 70° C., the paste material 10 was set in the raw material poring port 22, and the raw material poring cylinder 23 was kept in an air-tight state, and thereafter the lower whetstone 11 was rotated at 500 rpm. Then, nitrogen was run from the pressure port 24 provided in the raw material poring cylinder 23 at about 5 L/min, with pressure of 0.05 MPa, and then the paste material 10 was kneaded and dispersed while pushing it between the upper and lower whetstones 11 and 12. (In this example, the pressure reducing hole 29 is closed.) At this time, the temperature of the paste material 10 was constantly measured by a temperature sensor S, and the temperature of the water circulating in the void 26 for temperature adjustment was controlled.

When the paste material was treated for one minute, 200 g of a discharging amount of the metal paste was obtained when the interval gap (dg) of the whetstones was set to be 50 μm, and 50 g of the discharging amount of the metal paste was obtained when the interval gap (dg) of the whetstones was set to be 30 μm. Thus, in spite of a compact dispersion device, high productivity was obtained. In addition, in order to examine the state of the filler in the metal paste thus obtained, the maximum value of the size of the remaining particle was measured by the grind gage in the same way as the measurement for the paste material, and the result is shown in FIG. 2 (after the present treatment). As shown in FIG. 2, when the interval gap (dg) of the whetstones was set to be 50 μm, the particle diameter was distributed in the range from 45 to 25 μm, and no particle of 45 μm or more was measured. Similarly, when the (dg) was set to be 30 μm, the particle diameter was distributed in the range of 25 μm or less, and no particle of 30 μm or more was measured. As a result, after the present treatment according to the example 1, a sufficiently high dispersion state was obtained after preliminary kneading the paste material, in addition, no generation of the metal foil was observed, and the sample thus obtained had a good property as the metal paste.

COMPARATIVE EXAMPLE 1

In the same way as the example 1, the paste material was pored in the roll mill (a device of kneading and dispersing an object to be treated by mutually rotating three rolls arrayed in parallel so that the rotation direction thereof is in reverse each other, and passing the paste material in the gap of each roll), and then the paste material is kneaded and dispersed.

At this time, the gap of the roll mills was sequentially narrowed in three stages such as 140 μm, 100 μm, and 40 μm, and the sample was obtained in each stage.

COMPARATIVE EXAMPLE 2

Further, in the comparative example 1, the sample was also manufactured, which was treated first time after the preliminary kneading, by narrowing the interval of the roll mill to 40 μm.

Figure 3:
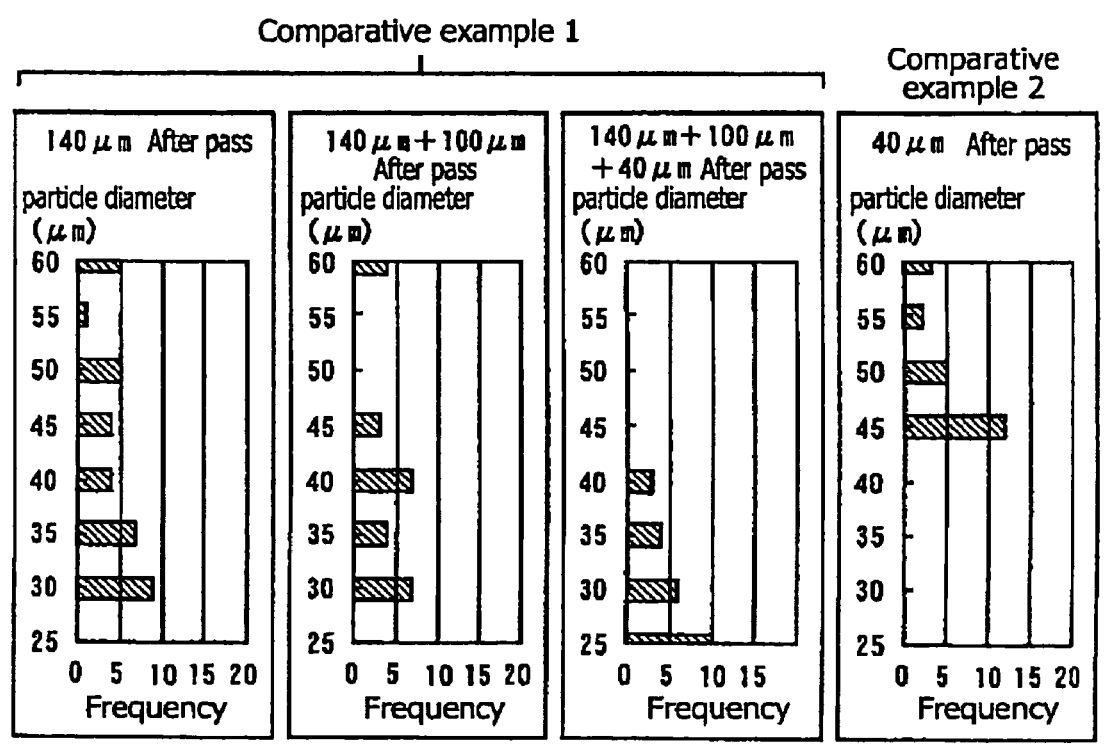
FIG. 3 is a graph showing a particle diameter distribution state after preliminary treatment and after the present treatment measured in a comparative example other than the present invention.

The size of the remaining particle of the sample thus manufactured in each comparative examples 1 and 2 was measured by the grind gage in the same way as the example 1, and the result is shown in FIG. 3. (FIG. 3 shows the same graph as that of FIG. 2).

As shown in FIG. 3, in the comparative example 1, a high dispersion state was eventually obtained after the treatment of three stages, however it took time to set each interval gap and the productivity was extremely deteriorated.

Meanwhile, in the comparative example 2, the gap of the roll mill was set to a narrow gap to obtain a high dispersion property at once. However as shown in FIG. 3, the dispersion state was not improved and the foil of the metal filler was observed.

As described above, the present invention was explained based on typical examples. However, the present invention is not limited thereto, and various modes are possible. For example, a substance other than the aforementioned examples can be used as the composition of a paste.

According to the present invention, the metal paste, in which the filler mainly composed of metal is mixed with good dispersibility, can be manufactured with good productivity at a low cost without generating the foil of the metal.

What is claimed is:

1. A manufacturing method of a metal paste having a viscosity of 60(Pa·s) or larger at a measured value by a rotational viscometer rotating at a shear rate of $2s^{-1}$, or 30(Pa·s) or larger at the measured value by the rotational viscometer rotating at a shear rate of $10s^{-1}$, comprising:

feeding a paste-like material containing a metal filler into a gap between whetstones which are relatively rotated while facing with each other, kneading, mixing and dispersing the paste-like material containing a metal filler while keeping the temperature of 40° C. to 80° C. so that the viscosity of the paste-like material containing a metal filler is within a range of 10 to 40(Pa·s) measured by the rotational viscometer rotating at a shear rate of $2s^{-1}$, and within a range of 2 to 20(Pa·s) measured by the rotational viscometer rotating at a shear rate of $10s^{-1}$, and by adjusting a gap interval "dg" of the whetstones in a range of (⅕) "dm" to 2 "dm" when the gap interval of the whetstones is represented by "dg" and a maximum particle size of the metal filler in the paste material is represented by "dm."

2. The manufacturing method of the metal paste according to claim 1, wherein the paste material is kneaded and dispersed, while applying a pressure difference of 0.01 MPa to 0.5MPa between the paste material fed into the whetstones and the paste material fed out from the whetstones.

3. The manufacturing method of the metal paste according to claim 1, wherein the viscosity of the metal paste of 60(Pa·s) or larger at a measured value by a rotational viscometer rotating at a shear rate of $2s_{-1}$, or the viscosity of 30(Pa·s) or larger at the measured value by the rotational viscometer rotating at a shear rate of $10s_{-1}$ are observed at room temperature.

* * * * *